(12) United States Patent
Koza

(10) Patent No.: US 12,743,442 B2
(45) Date of Patent: Sep. 22, 2026

(54) LARGE OBJECT DATA REPLICATION

(71) Applicant: International Business Machines Corporation, Armonk, NY (US)

(72) Inventor: Phillip Koza, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 17/966,403

(22) Filed: Oct. 14, 2022

(65) Prior Publication Data

US 2024/0126778 A1 Apr. 18, 2024

(51) Int. Cl.
*G06F 16/27* (2019.01)
*G06F 16/22* (2019.01)
*G06F 16/242* (2019.01)

(52) U.S. Cl.
CPC .......... *G06F 16/27* (2019.01); *G06F 16/2219* (2019.01); *G06F 16/242* (2019.01)

(58) Field of Classification Search
CPC ...... G06F 16/27; G06F 16/273; G06F 16/275; G06F 16/242; G06F 16/2219
See application file for complete search history.

(56) References Cited

U.S. PATENT DOCUMENTS 7,478,112 B2 1/2009 Dulay et al.
7,853,573 B2 12/2010 Warner et al.
2004/0167879 A1* 8/2004 Cotner ................ G06F 16/2219
2005/0193040 A1* 9/2005 Adiba ................ G06F 16/2219
2011/0087633 A1* 4/2011 Kreuder ................ G06F 16/273 707/610
2011/0238621 A1* 9/2011 Agrawal ............... G06F 16/178 707/610
2017/0199925 A1* 7/2017 Barry .................. G06F 16/2365
2020/0327097 A1* 10/2020 Birka ...................... G06F 16/21
2021/0256515 A1* 8/2021 Gale .................. G06Q 20/3827

FOREIGN PATENT DOCUMENTS

CN 105373621 A 3/2016
CN 106682066 A 5/2017
CN 107423452 A 12/2017
CN 112835918 A 5/2021
CN 114003622 B 4/2022
CN 117834549 A * 4/2024 ............. H04L 47/29
KR 100808368 B1 2/2008
WO 2017080431 A1 5/2017

* cited by examiner

*Primary Examiner* — Hares Jami
(74) *Attorney, Agent, or Firm* — Kimberly Zillig

(57) ABSTRACT

Within a database table being replicated from a source database to a target database, a first logged database operation on a database column holding large object (LOB) data is identified. The source database is queried for a plurality of rows of LOB data, each row in the plurality of rows of LOB data comprising LOB data stored in the database column holding LOB data. Responsive to determining that a first row of LOB data in the plurality of rows of LOB data is smaller than a message size threshold, the first row of LOB data is sent to the target database, the sending performed in a first message.

18 Claims, 7 Drawing Sheets

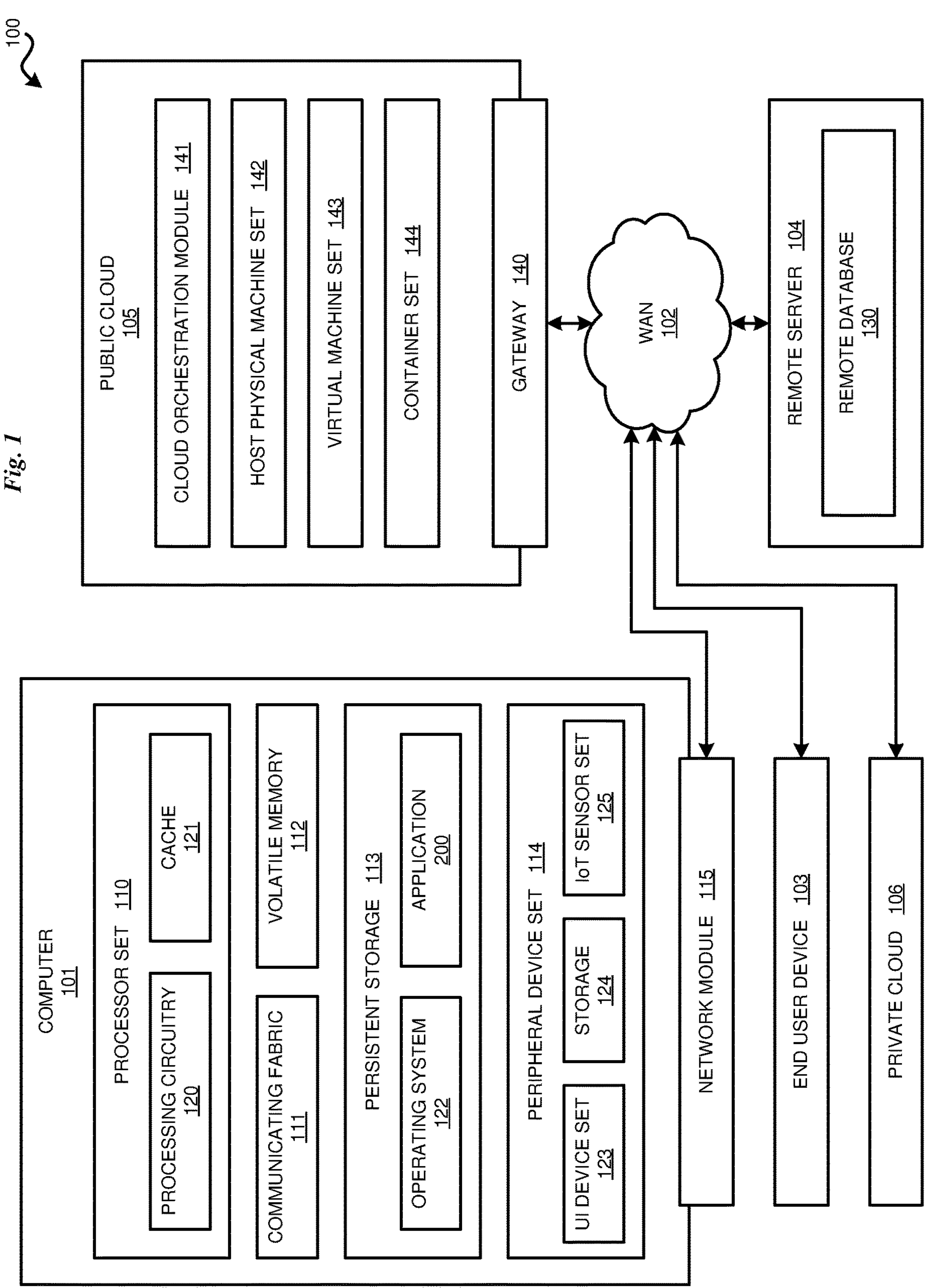
Fig. 1
100
PUBLIC CLOUD 105
CLOUD ORCHESTRATION MODULE 141
HOST PHYSICAL MACHINE SET 142
VIRTUAL MACHINE SET 143
CONTAINER SET 144
GATEWAY 140
WAN 102
REMOTE SERVER 104
REMOTE DATABASE 130
COMPUTER 101
PROCESSOR SET 110
PROCESSING CIRCUITRY 120
CACHE 121
COMMUNICATING FABRIC 111
VOLATILE MEMORY 112
PERSISTENT STORAGE 113
OPERATING SYSTEM 122
APPLICATION 200
PERIPHERAL DEVICE SET 114
UI DEVICE SET 123
STORAGE 124
IoT SENSOR SET 125
NETWORK MODULE 115
END USER DEVICE 103
PRIVATE CLOUD 106

Figure 2:
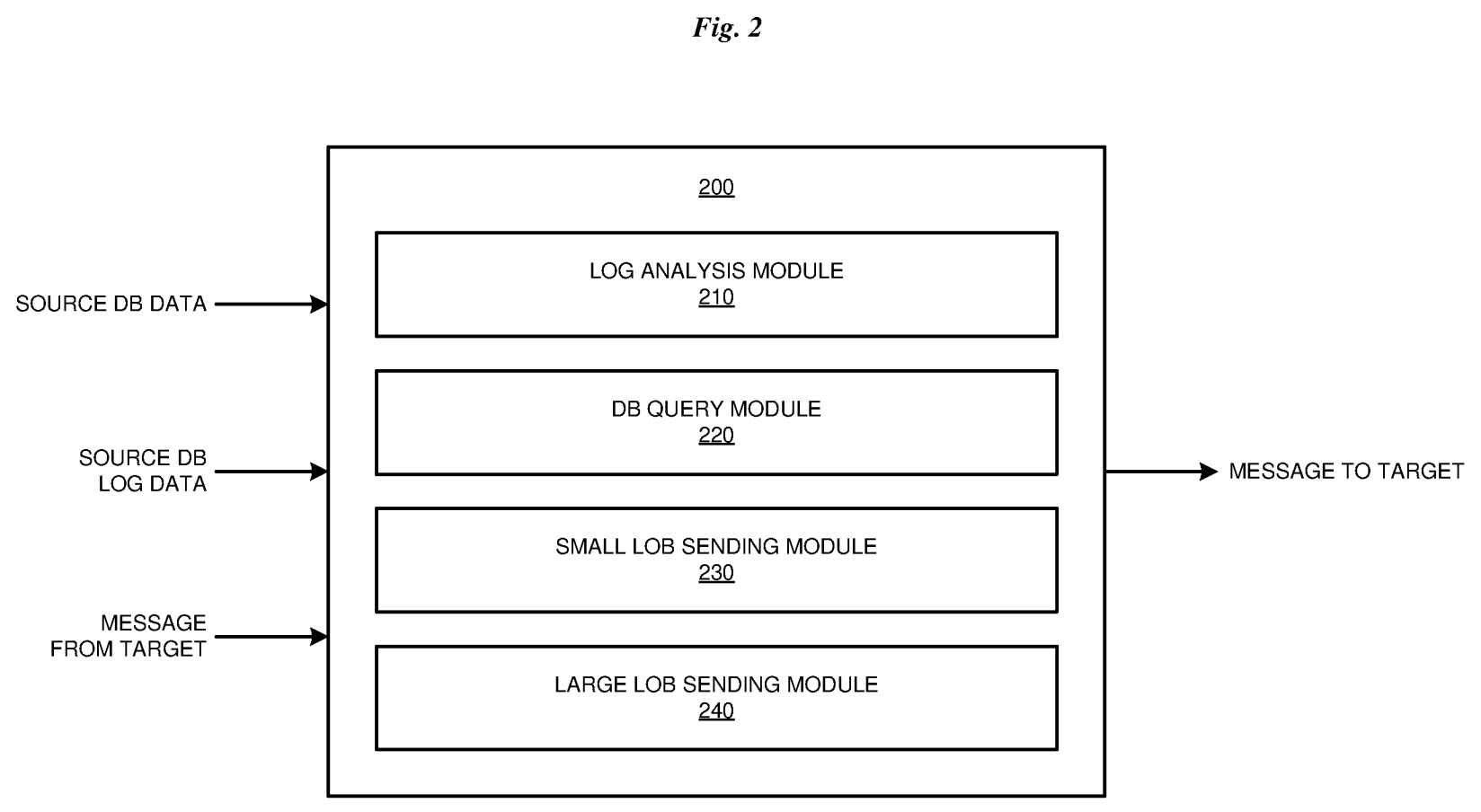

LOG ANALYSIS MODULE
210

DB QUERY MODULE
220

SMALL LOB SENDING MODULE
230

LARGE LOB SENDING MODULE
240

SOURCE DB DATA

SOURCE DB LOG DATA

MESSAGE FROM TARGET

MESSAGE TO TARGET

DATA TO TARGET DB

MESSAGE TO SOURCE

300

LOB RECEIVING MODULE
310

MESSAGE FROM SOURCE

*Fig. 3*

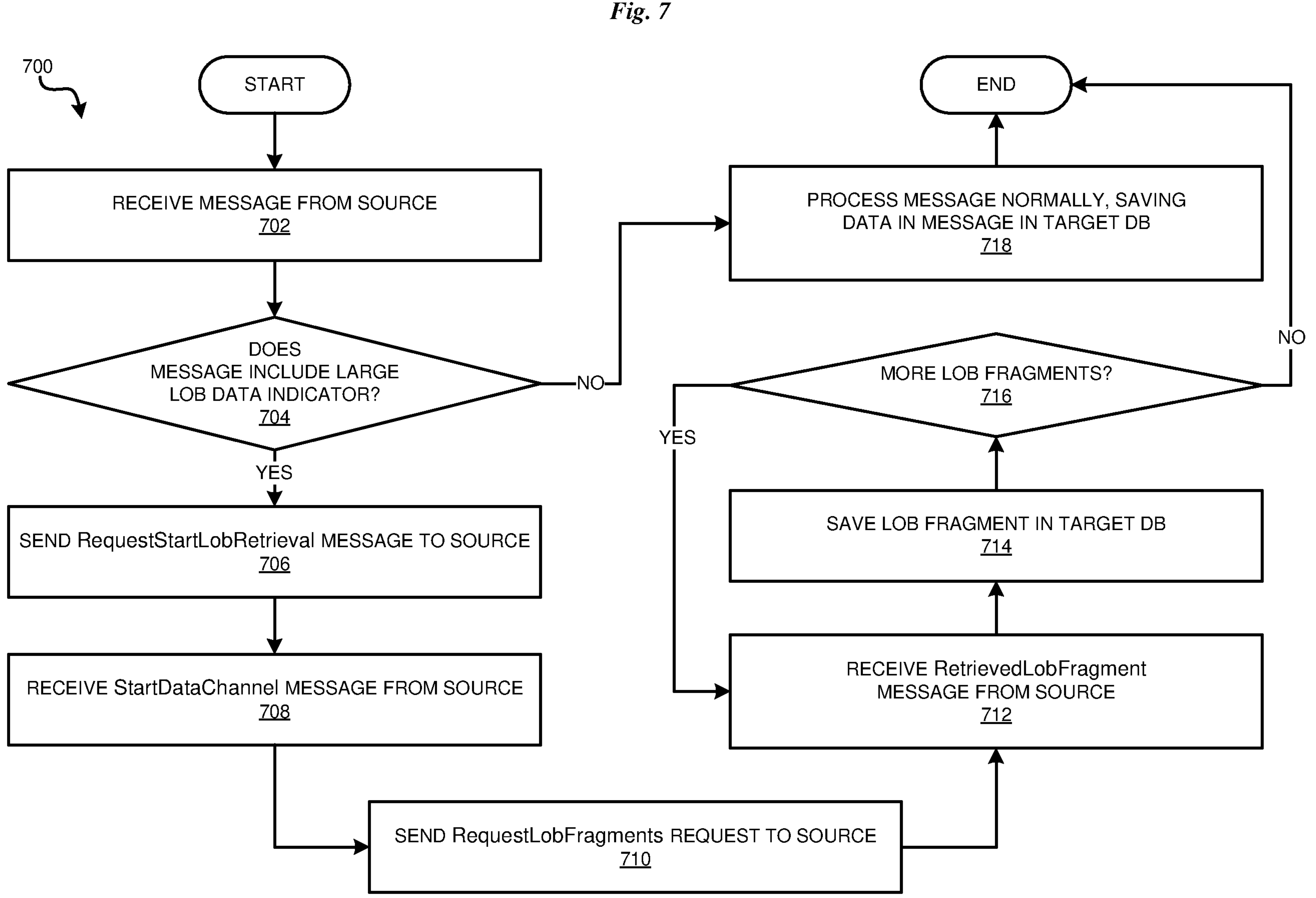

Fig. 7
700
START
RECEIVE MESSAGE FROM SOURCE
702
DOES
MESSAGE INCLUDE LARGE
LOB DATA INDICATOR?
704
YES
NO
SEND RequestStartLobRetrieval MESSAGE TO SOURCE
706
RECEIVE StartDataChannel MESSAGE FROM SOURCE
708
SEND RequestLobFragments REQUEST TO SOURCE
710
RECEIVE RetrievedLobFragment
MESSAGE FROM SOURCE
712
SAVE LOB FRAGMENT IN TARGET DB
714
MORE LOB FRAGMENTS?
716
YES
NO
PROCESS MESSAGE NORMALLY, SAVING
DATA IN MESSAGE IN TARGET DB
718
END

LARGE OBJECT DATA REPLICATION

BACKGROUND

The present invention relates generally to a method, system, and computer program product for database data replication. More particularly, the present invention relates to a method, system, and computer program product for Large Object (LOB) data replication.

Databases are typically structured as one or more two-dimensional tables. A row in a table refers to an individual set of records and a column, or attribute, in a table refers to a set of data values of a particular type. Thus, a row-column intersection holds a particular value of data of a particular type. For example, a table holding customer records might include columns for the customer's name, address, and telephone number. Each row in the table holds data for an individual customer. Thus, rows in the name column hold individual customers' names. A database may have a primary key—a defined set of columns or attributes that uniquely specify a row in a table. In simple cases, the primary key is a single attribute: a unique identification (e.g., a unique customer number or employee identification number). If no primary key exists, the columns of a unique index can be used instead to uniquely specify a row in a table. A source replication key refers to the primary key if one exists, a unique index if one exists, or all columns in a table.

LOBs are a set of datatypes, within a database, that are designed to hold large amounts of data, for example two gigabytes or more. For example, the Binary Large Object (BLOB) data type is typically used for columns that contain a large amount of binary data such as text, graphic images and individual video frames, video, and sound data, and the Character Large Object (CLOB) data type is typically used for columns that contain a large amount of character data such as document files (e.g., in extensible markup language (XML) format, JavaScript Object Notation (JSON) format, or a word processor file format).

Because typical database implementations do not support storing column values in multiple memory pages, the maximum size of the data stored in a column must be less than the page size (typically (4-32 kilobytes). LOB values that are small enough to be stored in a table column are referred to as inline LOBs. However, most LOB values will not fit within a page, and are stored off page, i.e., in a separate set of pages that store just the data for one row-LOB column intersection. LOB values that will not fit within a page are referred to as non-inline LOBs. Some database implementations treat all LOB values as non-inline LOBs.

Typically, database implementations record, or log, transactions and the database modifications made by each transaction in a transaction log. The transaction log supports individual transaction recovery, recovery of incomplete transactions when the database server is started, rolling a restored database, file, filegroup, or page forward to a point of failure, and database replication solutions that replicate logged transactions at a different location. However, because of LOB values' large size, typical database implementations do not log LOB data transactions for non-inline LOBs. Instead, new LOB data pages are forced to storage when a transaction commits, eliminating the need for a redo capability for LOB data. In addition, pages that hold an old LOB value are not deleted until transaction commit, ensuring that an undo can be performed up to transaction commit.

Databases typically communicate with each other using messages. Messages include one or more of a command, status data, and database data. Messages have a size limit, for example 32 or 64 kilobytes. Thus, messages are often smaller than LOB values.

SUMMARY

The illustrative embodiments provide a method, system, and computer program product. An embodiment includes a method that identifies, within a database table being replicated from a source database to a target database, a first logged database operation on a database column holding large object (LOB) data. An embodiment queries the source database for a plurality of rows of LOB data, each row in the plurality of rows of LOB data comprising LOB data stored in the database column holding LOB data. An embodiment sends, responsive to determining that a first row of LOB data in the plurality of rows of LOB data is smaller than a message size threshold, the first row of LOB data to the target database, the sending performed in a first message.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 1 depicts an example diagram of a data processing environments in which illustrative embodiments may be implemented;

FIG. 2 depicts a block diagram of an example configuration for LOB data replication in accordance with an illustrative embodiment;

FIG. 3 depicts a block diagram of an example configuration for LOB data replication in accordance with an illustrative embodiment;

FIG. 7 depicts a flowchart of an example process for LOB data replication in accordance with an illustrative embodiment.

DETAILED DESCRIPTION

Figure 4:
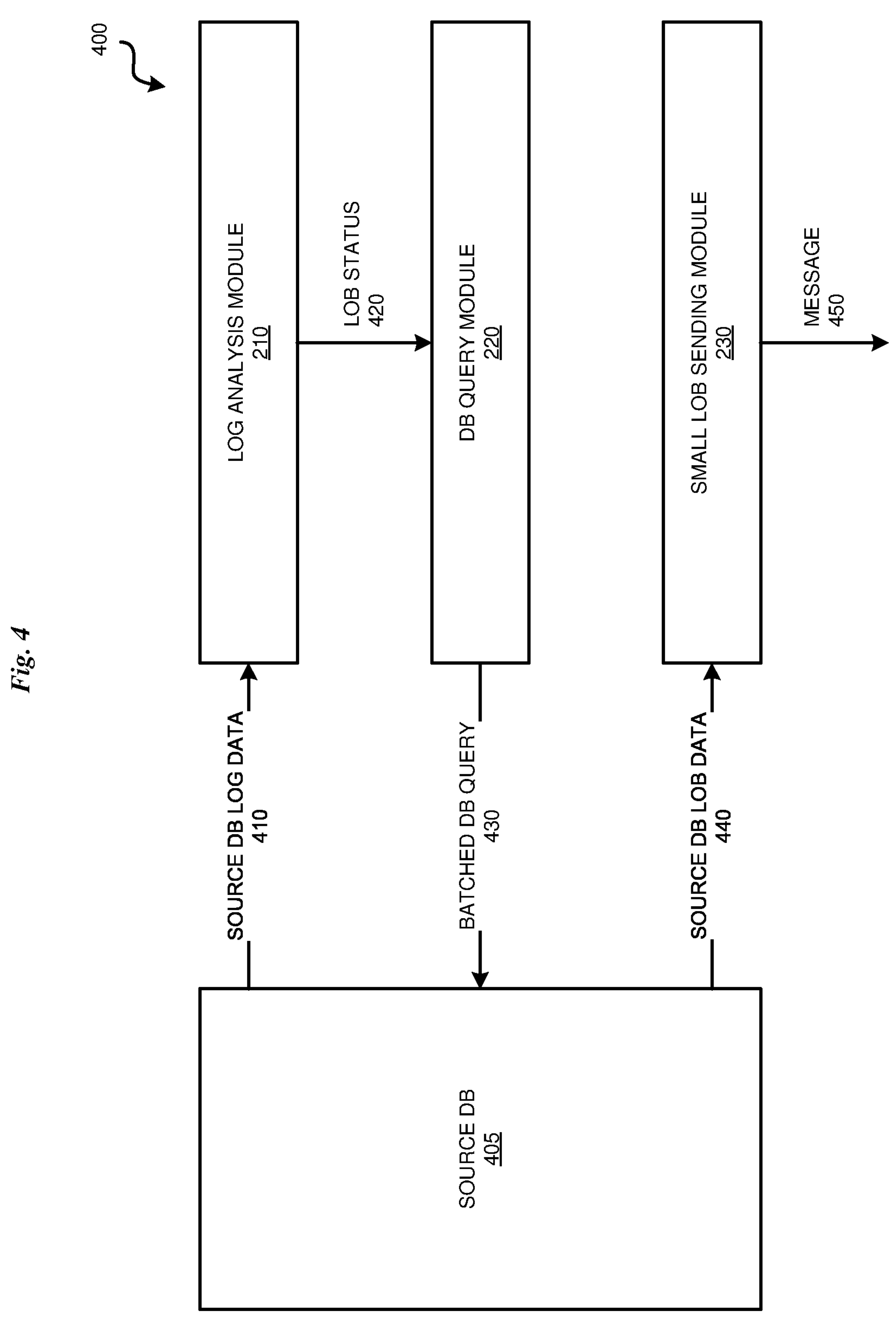
FIG. 4 depicts a flow diagram of an example configuration for LOB data replication in accordance with an illustrative embodiment.

The illustrative embodiments recognize that, because typical database implementations do not log LOB data for non-inline LOBs, real time log-based replication of LOB data is undesirably resource-intensive and slow. Because non-inline LOB data are not logged, the log record for a row containing non-inline LOB column values includes an indicator for each unlogged column. When replicating database data using the log data, a replication agent log parser at the data source skips replication of columns indicated as not logged. At a later stage, the replication process, instead of simply referencing the log, issues a select statement (i.e., queries the database) to fetch a current value for each unlogged column in a row. If the data stored in the LOB column being duplicated is small enough to fit in a communication message between source and target databases, the source replication agent sends the LOB data to a replication agent at the target as part of a message. At the target, the replication agent inserts the LOB data into an appropriate location as a byte array or string. If the data stored in the LOB column being duplicated is not small enough to fit in a communication message between source and target databases, the LOB data is divided into fragments and sent in separate LOB fragment messages. At the target, the LOB data accumulates in memory or in storage (if the LOB data is too large to fit in memory). Once all of the LOB data is received, the target creates a stream, and stores the LOB data in the target database by specifying the created stream as the source of data for this column in the row being inserted or updated. Thus, reading the LOB data during replication requires issuing a database query for every logged operation with at least one non-inline LOB column, which will be most of the insert operations and update operations that modify a LOB column (or all of them if the database does not support inline LOBs). Thus, the illustrative embodiments recognize that database replication of LOB data can be sped up by reducing the number of database queries required to replicate LOB data.

The illustrative embodiments also recognize that received LOB data accumulates in the target system's memory or in storage (referred to as materializing the data) until an entire row of data has been received at the target and is ready for insertion into the target database. However, materializing the data is also undesirable. If saved in memory, incoming LOB data can slow other system operations by increasing a need to swap memory pages to disk or other storage. Saving LOB data in storage adds to resource requirements of the target system and renders storage resources unavailable for other uses. The database replication process must wait until writing LOB data to storage is complete before receiving more incoming LOB data, slowing the database replication process. Reading the data from storage for insertion into the target database also slows operation of the target database. In addition, receiving and writing LOB data can be asynchronous, so LOB data can accumulate in storage until the target database is ready to receive it. Thus, the illustrative embodiments recognize that database replication of LOB data can be sped up by eliminating data materialization on the target database's system.

Consequently, the illustrative embodiments recognize that there is a need to improve database replication of LOB data by reducing the number of database queries required to replicate LOB data and eliminating data materialization on the target database's system.

The illustrative embodiments recognize that the presently available tools or solutions do not address these needs or provide adequate solutions for these needs. The illustrative embodiments used to describe the invention generally address and solve the above-described problems and other problems related to LOB data replication.

An embodiment can be implemented as a software application. The application implementing an embodiment can be configured as a modification of an existing database replication or database management system, as a separate application that operates in conjunction with an existing database replication or database management system, a standalone application, or some combination thereof.

Particularly, some illustrative embodiments provide a method that, at a source embodiment, identifies, within a database table being replicated from a source database to a target database, a first logged database operation on a database column holding LOB data, queries the source database for a plurality of rows of LOB data, each row in the plurality of rows of LOB data comprising LOB data stored in the database column holding LOB data, and sends, responsive to determining that a first row of LOB data in the plurality of rows of LOB data is smaller than a message size threshold, the first row of LOB data to the target database.

As part of replicating a database from a source database to a target database, a source embodiment analyzes log data of the source database. One source embodiment executes on the same computer system as the source database and one target embodiment executes on the same computer system as the target database. However, neither embodiment is required to execute on the same system as a database being hosted. In addition, the source and target databases execute on the same system, or on different systems from each other. If a source embodiment determines that the log data does not include an indicator of non-inline LOB data, all database data has been logged and no special LOB data handling is required. If a source embodiment determines that the log data includes an indicator of non-inline LOB data, that LOB data has not been logged and special LOB data handling is required.

A source embodiment queries the source database for the unlogged, non-inline LOB data. In one source embodiment, the query specifies the replication key column(s) in the WHERE clause and all non-inline LOB columns in the SELECT list from the source database table being replicated. One source embodiment, executing in an environment that supports multiple threads executing in parallel, is part of a replication pipeline, in which a main source database replication thread analyzes log data and a message sending thread sends messages including data from the source database to a target database. The source embodiment implements source database queries in a separate thread (e.g., called SmallLobExtractor), executing in parallel with the main source database replication thread. In this implementation, the main source replication thread puts each LOB data operation into an input queue for the SmallLobExtractor thread.

One source embodiment performs a separate query of the source database for each LOB data row. However, databases typically support OR optimization, in which multiple database rows specified by OR predicates are accessed in one query. Thus, to reduce the number of database queries required to replicate LOB data, if the database being replicated supports OR optimization and if the replication key columns are primary key or unique index columns, a source embodiment forms batches of queries. One source embodiment forms a batch of queries of multiple rows using the SQL SELECT command, which is used to select data from a database. In particular, because the SQL WHERE command filters a result set to include only records that fulfill a specified condition, and the IN command is a shorthand for multiple OR conditions, allowing specification of multiple values in a WHERE clause, the source embodiment forms a query with the statement WHERE [replication key columns] IN [list of replication key column values for the batched operations]. Thus, a source embodiment executing in a threaded implementation begins forming a batch of queries by constructing a query using replication key column values specified by a LOB data operation in the SmallLobExtractor thread's input queue. Then, as long as one or more conditions for breaking the batch are not met, the source embodiment adds replication key column values specified by the next non-inline LOB data operation in the SmallLobExtractor thread's input queue to the query being constructed. One source embodiment continues the existing batch until the next LOB operation in the queue specifies a different operation, different table, different number of LOB columns, no next LOB operation is available in the queue without waiting, or until a maximum batch size (e.g., 25 operations) is reached. Another source embodiment continues the existing batch even if the next LOB operation in the queue specifies a different operation, as long as both operations are either insert or update operations. However, if the next LOB operation in the queue specifies an operation other than insert or update, such as a delete operation, the source embodiment ends the batch. Note that although examples are presented herein in the form of SQL statements, statements that perform similar functions implemented in another database query language are also possible and are contemplated within the scope of the illustrative embodiments.

The data returned from a query is typically in the form of in a result table, called the result set. A source embodiment processes one result set row at a time, and stores the results from a batch in a hash table (a data structure that maps keys to values) in which the key is a composite of the replication key columns, and the stored value contains non-inline LOB column data for that row. A hash table is only an example data structure, and another source embodiment uses another data structure. LOBs that can fit into one database communication message (and thus are smaller than a message size threshold) are referred to as small LOBs, while LOBs with a size equal to the maximum size of a small LOB plus one byte (and hence cannot fit into one database communication message) are referred to as large LOBs. In one source embodiment, the stored value in the hash table only includes LOB data up to one more byte than the maximum size of a small LOB, since only small LOBs are to be sent using data in the hash table.

In a source embodiment executing in a threaded implementation, the SmallLobExtractor thread gets each list of LOB column data for a row (i.e., values in the hash table that are the results of fetching LOBs for that operation) from the hash table in the same order that the operations arrived in the SmallLobExtractor thread's input queue, and puts the list in the SmallLobExtractor thread's output queue. A message sending thread examines each operation it receives to see if the operation involves non-inline LOBs. If the operation involves non-inline LOBs, the message sending thread gets the non-inline LOBs for that row from the SmallLobExtractor output queue. The message sending thread determines whether the LOB data is small (i.e., will fit into a message) or large (i.e., will not fit into a message). If the LOB data is small, the message sending thread includes the LOB data in the message and sends the message to the target database just as it would for a message that did not include LOB data. If the LOB data is large, the LOB data in the message is replaced by an indicator that this is a large LOB, and the message sending thread sends the resulting message to the target database just as it would for a message that did not include LOB data. A source embodiment that does not execute in a threaded implementation performs the operations described herein without using separate threads.

A target embodiment receives database replication messages from a source embodiment. A message that includes a small LOB or no LOB needs no special handling. If a message includes a large LOB indicator instead of actual LOB data, the LOB data must be sent from the source database. Thus, one target embodiment queries a source database for the LOB data. However, querying a database from a remote system can be unacceptably slow. In addition, the target embodiment does not necessarily know what type of database the source is, and different source databases require different query syntaxes. As well, the target embodiment might not be authorized to access the source database directly. Thus, another target embodiment implements another method to acquire large LOB data from the source database.

Source and target embodiments executing in a threaded implementation include a LOB retrieval pipeline (e.g., called LobRetrieval) for each thread applying data that is not part of a large LOB to the target database. The LobRetrieval pipeline includes a thread executing in a source embodiment (e.g., called LargeLobExtractor) that reads LOB data from the database and sends the data to a target embodiment, a thread executing in a target embodiment (e.g., called LobRetriever) that reads the LOB data messages from a source embodiment, and one or more communications sockets for transporting messages between the target and source embodiments. In one target embodiment, the LobRetriever thread has blocking input and output queues. In a blocking queue, puts of an object to the queue block, or wait, if the queue is full until there is room for the object, and gets of an object from the queue block, or wait, if the queue is empty. This is contrast to a non-blocking queue, which will immediately return failure instead of waiting if an attempt to put to a full queue or get from an empty queue is made.

When a thread applying data to the target database encounters the first message that includes a large LOB indicator instead of actual LOB data, source and target embodiments configure the LobRetrieval pipeline. The LobRetrieval pipeline has one target thread—the LobRetriever thread. In particular, the target embodiment sends a RequestStartLobRetrieval message to a source embodiment via an existing communications channel. In one source and target embodiment pair, the RequestStartLobRetrieval message includes a thread number of the thread applying data to the target database. A source embodiment responds to receipt of the RequestStartLobRetrieval message by configuring a LargeLobExtractor thread. One source embodiment configures a LargeLobExtractor thread for each thread number received in a RequestStartLobRetrieval message from a target embodiment. A source embodiment also responds to receipt of the RequestStartLobRetrieval message by configuring communications sockets for transporting messages between the target and source embodiments. Multiple threads applying data to the target database cannot share a pair of sockets. Hence, in one source and target embodiment pair, there are two communications sockets (one for messages from the source to the target and another for messages from the target to the source) per received thread number, so that each thread applying data to the target database has its own dedicated pair of sockets. The dedicated pair of sockets comprises a LOB retrieval data channel that is separate from a communication channel used to send non-LOB data messages or status messages between source and target embodiments. When the sockets have been configured, a source embodiment sends a StartDataChannel message to a target embodiment. In one source and target embodiment pair, the StartDataChannel message includes the thread number the source embodiment received in the RequestStartLobRetrieval message. The target embodiment's receipt of the StartDataChannel message indicates that the LOB retrieval data channel is ready for use. In embodiments in which the StartDataChannel message includes a thread number, the target embodiment's receipt of the StartDataChannel message including a thread number matching the thread number the target embodiment originally sent in the RequestStartLobRetrieval message indicates that the thread-specific LOB retrieval data channel is ready for use by that thread.

In a target embodiment, when the thread applying data to the target database encounters a previously unseen table with one or more large LOBs, the thread calls a method that notifies the LobRetriever thread. The LobRetriever thread issues a RequestLobRetrievalReplicationKeyCols message to obtain data indicating which source table columns are part of the table's replication key. The source embodiment replies with an array of the source table replication key column identifiers. In one target embodiment, the thread applying data to the target database maintains a hash table in which the key is a source table identifier and the value is the array of the source table replication key column identifiers. When processing subsequent large LOBs of a table for which data exists in the hash table, the thread applying data to the target database obtains source table replication column identifiers from the hash table instead of re-querying the source embodiment. Source and target embodiments that do not execute in a threaded implementation performs the operations described herein without using separate threads.

The LOB data is applied to the target database via an input stream (e.g., called a ColumnFragment input stream) that supplies the value for each LOB column. An input stream is a presently available construct used by databases to read LOB data. When the LOB is small, the ColumnFragment input stream reads the lob data from the message. When the lob is large, the ColumnFragment input stream reads the LOB data from the replication source process via the LobRetrieval pipeline for this thread (described elsewhere herein). When the target database calls the read( ) method of the ColumnFragment input stream, if this is the first time read( ) has been called for this lob, the ColumnFragment input stream implementation of read( ) calls a data-reading method that notifies the LobRetriever thread. The LobRetriever thread issues a RequestLobFragments message to the source embodiment. The RequestLobFragments message requests that the source embodiment read the LOB data from the source database and send the read LOB data to the target embodiment. In one set of source and target embodiments, the RequestLobFragments message includes the source replication key column values that uniquely identify the source row of the LOB data, the column identifier for one or more large LOB columns being replicated, and one or more column identifiers for any additional large LOB columns involved in the database operation being replicated. Each message specifies all of the columns with large LOB values, so that a source embodiment can issue one database command that fetches all of the large LOB columns.

When a source embodiment receives a RequestLobFragments message, if this is the first request for this row, the source embodiment queries the source database for the data by executing a select statement of all the columns specified in the message, with a where clause including equality predicates on the replication key columns, equating to the replication key column values sent in the message. If the RequestLobFragments message is not the first request for this row, the source embodiment uses an existing result set of previously querying the database for the row. In either case, the source embodiment extracts the LOB data for a requested LOB column and sends the requested data via the established data channel to a target embodiment using one or more RetrievedLobFragment messages. Each RetrievedLobFragment message includes a portion of LOB data that is small enough to fit into a message. Once all bytes of the last LOB have been sent, a source embodiment can close or remove the result set.

The LobRetriever thread of the target embodiment receives RetrievedLobFragment messages from the source embodiment, and puts LOB data received in a message into its output queue. The read( ) method of the ColumnFragment input stream gets LOB data from the LobRetriever thread output queue until reaching an indicator of the end of the LOB data, and applies the data to the database. Because the LobRetriever thread output queue is a blocking queue, it automatically paces the LobRetriever thread's fetching of LOB data fragments from the source embodiment and the data-reading method's reading of those fragments. If the data-reading method is too far ahead of the LobRetriever thread, the data-reading method will wait. If the data-reading method is too far behind the LobRetriever thread, the LobRetriever thread will wait. Thus, the size of the LobRetriever thread's output queue controls how much LOB data will be present in memory at any one time, avoiding the need to temporarily store an entire LOB in the target database system's memory or storage.

The manner of LOB data replication described herein is unavailable in the presently available methods in the technological field of endeavor pertaining to database management. A method of an embodiment described herein, when implemented to execute on a device or data processing system, comprises substantial advancement of the functionality of that device or data processing system in, at a source embodiment, identifying, within a database table being replicated from a source database to a target database, a first logged database operation on a database column holding LOB data, querying the source database for a plurality of rows of LOB data, each row in the plurality of rows of LOB data comprising LOB data stored in the database column holding LOB data, and sending, responsive to determining that a first row of LOB data in the plurality of rows of LOB data is smaller than a message size threshold, the first row of LOB data to the target database.

The illustrative embodiments are described with respect to certain types of database operations, LOB data, database query statements, messages, message names, threads and thread names, communication channels, thresholds, responses, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to the figures and in particular with reference to FIG. 1, this figure is an example diagram of a data processing environments in which illustrative embodiments may be implemented. FIG. 1 is only an example and are not intended to assert or imply any limitation with regard to the environments in which different embodiments may be implemented. A particular implementation may make many modifications to the depicted environments based on the following description. FIG. 1 depicts a block diagram of a network of data processing systems in which illustrative embodiments may be implemented. Computing environment 100 contains an example of an environment for the execution of at least some of the computer code involved in performing the inventive methods, such as application 200. Application 200 implements a LOB data replication source embodiment or target embodiment described herein. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144. Application 200 executes in any of computer 101, end user device 103, remote server 104, or a computer in public cloud 105 or private cloud 106 unless expressly disambiguated. In addition, application 200 executes on the same or a different system as a source database being replicated.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processor set 110 may contain one or more processors and may be implemented using one or more heterogeneous processor systems. A processor in processor set 110 may be a single- or multi-core processor or a graphics processor. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Operating system 122 runs on computer 101. Operating system 122 coordinates and provides control of various components within computer 101. Instructions for operating system 122 are located on storage devices, such as persistent storage 113, and may be loaded into at least one of one or more memories, such as volatile memory 112, for execution by processor set 110.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of application 200 may be stored in persistent storage 113 and may be loaded into at least one of one or more memories, such as volatile memory 112, for execution by processor set 110. The processes of the illustrative embodiments may be performed by processor set 110 using computer implemented instructions, which may be located in a memory, such as, for example, volatile memory 112, persistent storage 113, or in one or more peripheral devices in peripheral device set 114. Furthermore, in one case, application 200 may be downloaded over WAN 102 from remote server 104, where similar code is stored on a storage device. In another case, application 200 may be downloaded over WAN 102 to remote server 104, where downloaded code is stored on a storage device.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, user interface (UI) device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. Internet of Things (IoT) sensor set 125 is made up of sensors that can be used in IoT applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

Wide area network (WAN) 102 is any WAN (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

With reference to FIG. 2, this figure depicts a block diagram of an example configuration for LOB data replication in accordance with an illustrative embodiment. Application 200 is the same as application 200 in FIG. 1. In particular, application 200 implements a LOB data replication source embodiment described herein.

As part of replicating a database from a source database to a target database, log analysis module 210 analyzes log data of the source database. If module 210 determines that the log data does not include an indicator of non-inline LOB data, all database data has been logged and no special LOB data handling is required. If module 210 determines that the log data includes an indicator of non-inline LOB data, that LOB data has not been logged and special LOB data handling is required.

Database (DB) query module 220 queries the source database for the unlogged, non-inline LOB data. In one implementation of module 220, the query specifies the replication key column(s) in the WHERE clause and all non-inline LOB columns in the SELECT list from the source database table being replicated. One implementation of module 220, executing in an environment that supports multiple threads executing in parallel, is part of a replication pipeline, in which a main source database replication thread analyzes log data and a message sending thread sends messages including data from the source database to a target database. Module 220 implements source database queries in a separate thread (e.g., called SmallLobExtractor), executing in parallel with the main source database replication thread. In this implementation of module 220, the main source replication thread puts each LOB data operation into an input queue for the SmallLobExtractor thread.

One implementation of module 220 performs a separate query of the source database for each LOB data row. To reduce the number of database queries required to replicate LOB data, if the database being replicated supports OR optimization and if the replication key columns are primary key or unique index columns, another implementation of module 220 forms batches of queries. One implementation of module 220 forms a batch of queries of multiple rows using the SQL SELECT command, which is used to select data from a database. In particular, because the SQL WHERE command filters a result set to include only records that fulfill a specified condition, and the IN command is a shorthand for multiple OR conditions, allowing specification of multiple values in a WHERE clause, module 220 forms a query with the statement WHERE [replication key columns] IN [list of replication key column values for the batched operations]. Thus, module 220 executing in a threaded implementation begins forming a batch of queries by constructing a query using replication key column values specified by a LOB data operation in the SmallLobExtractor thread's input queue. Then, as long as one or more conditions for breaking the batch are not met, module 220 adds replication key column values specified by the next non-inline LOB data operation in the SmallLobExtractor thread's input queue to the query being constructed. One implementation of module 220 continues the existing batch until the next LOB operation in the queue specifies a different operation, different table, different number of LOB columns, no next LOB operation is available in the queue without waiting, or until a maximum batch size (e.g., 25 operations) is reached. Another implementation of module 220 continues the existing batch even if the next LOB operation in the queue specifies a different operation, as long as both operations are either insert or update operations. However, if the next LOB operation in the queue specifies an operation other than insert or update, such as a delete operation, module 220 ends the batch.

The data returned from a query is typically in the form of in a result table, called the result set. Small LOB sending module 230 processes one result set row at a time, and stores the results from a batch in a hash table in which the key is a composite of the replication key columns, and the stored value contains non-inline LOB column data for that row. In one implementation of module 230, the stored value in the hash table only includes LOB data up to one more byte than the maximum size of a small LOB, since only small LOBs are to be sent using data in the hash table.

In an implementation of module 230 executing in a threaded implementation, the SmallLobExtractor thread gets each list of LOB column data for a row from the hash table in the same order that the operations arrived in the SmallLobExtractor thread's input queue, and puts the list in the SmallLobExtractor thread's output queue. A message sending thread examines each operation it receives to see if the operation involves non-inline LOBs. If the operation involves non-inline LOBs, the message sending thread gets the LOBs for that row from the SmallLobExtractor output queue. The message sending thread determines whether the LOB data is small (i.e., will fit into a message) or large (i.e., will not fit into a message). If the LOB data is small, the message sending thread includes the LOB data in the message and sends the message to the target database just as it would for a message that did not include LOB data. If the LOB data is large, the LOB data in the message is replaced by an indicator that this is a large LOB, and the message sending thread sends the resulting message to the target database just as it would for a message that did not include LOB. An implementation of module 230 that does not execute in a threaded implementation performs the LOB sending operations described herein without using separate threads.

Application 200 also includes large LOB sending module 240. Module 240 is described further elsewhere herein, together with application 300 with which module 240 communicates.

Figure 3:
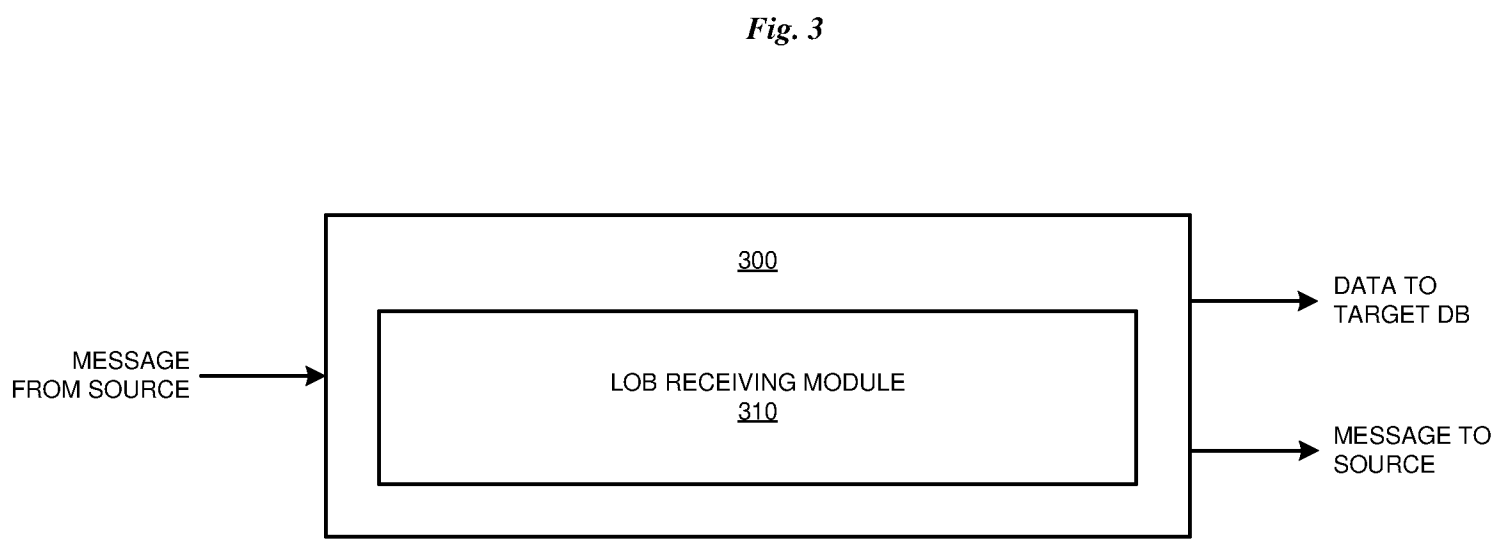

With reference to FIG. 3, this figure depicts a block diagram of an example configuration for LOB data replication in accordance with an illustrative embodiment. Application 300 is an instance of application 200 in FIG. 1 and implements a LOB data replication target embodiment described herein.

Application 300 receives database replication messages from a source embodiment. A message that includes a small LOB or no LOB needs no special handling. If a message includes a large LOB indicator instead of actual LOB data, the LOB data must be sent from the source database. Thus, one implementation of LOB receiving module 310 queries a source database for the LOB data. However, querying a database from a remote system can be unacceptably slow. In addition, module 310 does not necessarily know what type of database the source is, and different source databases require different query syntaxes. As well, module 310 might not be authorized to access the source database directly. Thus, another implementation of module 310 implements another method to acquire large LOB data from the source database.

Applications 200 and 300, when executing in a threaded implementation, include a LOB retrieval pipeline (e.g., called LobRetrieval) for each thread applying data that is not part of a large LOB to the target database. The LobRetrieval pipeline includes a thread executing in application 200 (e.g., called LargeLobExtractor) that reads LOB data from the database and sends the data to application 300, a thread executing in LOB receiving module 310 (e.g., called LobRetriever) that reads the LOB data messages from application 200, and one or more communications sockets for transporting messages between the target and source embodiments. In one implementation of module 310, the LobRetriever thread has blocking input and output queues.

When a thread applying data to the target database encounters the first message that includes a large LOB indicator instead of actual LOB data, applications 200 and 300 configure the LobRetrieval pipeline. In particular, module 310 sends a RequestStartLobRetrieval message to module 240 via an existing communications channel. In one source-target implementation pair, the RequestStartLobRetrieval message includes a thread number of the thread applying data to the target database. Module 240 responds to receipt of the RequestStartLobRetrieval message by configuring a LargeLobExtractor thread. One implementation of module 240 configures a LargeLobExtractor thread for each thread number received in a RequestStartLobRetrieval message from module 310. Module 240 also responds to receipt of the RequestStartLobRetrieval message by configuring communications sockets for transporting messages between target and source. In one source-target implementation pair, there are two communications sockets (one for messages from the source to the target and another for messages from the target to the source). In another source-target implementation pair, there are two communications sockets (one for messages from the source to the target and another for messages from the target to the source) per received thread number, so that each thread applying data to the target database has its own dedicated pair of sockets. The dedicated pair of sockets comprises a LOB retrieval data channel that is separate from a communication channel used to send non-LOB data messages or status messages between source and target embodiments. When the sockets have been configured, module 240 sends a StartDataChannel message to module 310. In one source-target implementation pair, the StartDataChannel message includes the thread number module 240 received in the RequestStartLobRetrieval message. Module 310's receipt of the StartDataChannel message indicates that the LOB retrieval data channel is ready for use. In implementations in which the StartDataChannel message includes a thread number, module 310's receipt of the StartDataChannel message including a thread number matching the thread number the target embodiment originally sent in the RequestStartLobRetrieval message indicates that the thread-specific LOB retrieval data channel is ready for use by that thread.

In application 300, when the thread applying data to the target database encounters a previously unseen table with one or more large LOBs, the thread calls a method that notifies the LobRetriever thread. The LobRetriever thread issues a RequestLobRetrievalReplicationKeyCols message to obtain data indicating which source table columns are part of the table's replication key. Module 240 replies with an array of the source table replication key column identifiers. In one implementation of application 300, the thread applying data to the target database maintains a hash table in which the key is a source table identifier and the value is the array of the source table replication key column identifiers. When processing subsequent large LOBs of a table for which data exists in the hash table, the thread applying data to the target database obtains source table replication column identifiers from the hash table instead of re-querying application 200. Implementations of applications 200 and 300 that do not execute in a threaded implementation perform the operations described herein without using separate threads.

In application 300, LOB data is applied to the target database via an input stream (e.g., called a ColumnFragment input stream) that supplies the value for each LOB column. When the LOB is small, the ColumnFragment input stream reads the lob data from the message. When the lob is large, the ColumnFragment input stream reads the LOB data from the replication source process via the LobRetrieval pipeline for this thread (described elsewhere herein). When the target database calls the read( ) method of the ColumnFragment input stream, if this is the first time read( ) has been called for this lob, the ColumnFragment input stream implementation of read( ) calls a data-reading method that notifies the LobRetriever thread. The LobRetriever thread issues a RequestLobFragments message to module 240. The RequestLobFragments message requests that module 240 read the LOB data from the source database and send the read LOB data to module 310. In one source-target implementation pair, the RequestLobFragments message includes the source replication key column values that uniquely identify the source row of the LOB data, the column identifier for one or more large LOB columns being replicated, and one or more column identifiers for any additional large LOB columns involved in the database operation being replicated. Each message specifies all of the columns with large LOB values, so that application 200 can issue one database command that fetches all of the large LOB columns.

When application 200 receives a RequestLobFragments message, if this is the first request for this row, module 220 queries the source database for the data by executing a select statement of all the columns specified in the message, with a where clause including equality predicates on the replication key columns, equating to the replication key column values sent in the message. If the RequestLobFragments message is not the first request for this row, module 240 uses an existing result set of previously querying the database for the row. In either case, module 240 obtains the LOB data for a requested LOB column and sends the requested data via the established data channel to module 310 using one or more RetrievedLobFragment messages. Each RetrievedLobFragment message includes a portion of LOB data that is small enough to fit into a message. Once all bytes of the last LOB have been sent, application 200 can close or remove the result set.

The LobRetriever thread of module 310 receives RetrievedLobFragment messages from application 200, and puts LOB data received in a message into its output queue. The read( ) method of the ColumnFragment input stream gets LOB data from the LobRetriever thread output queue until reaching an indicator of the end of the LOB data, and applies the data to the database. Because the LobRetriever thread output queue is a blocking queue, it automatically paces the LobRetriever thread's fetching of LOB data fragments from the source embodiment and the data-reading method's reading of those fragments.

With reference to FIG. 4, this figure depicts a flow diagram of an example configuration for LOB data replication in accordance with an illustrative embodiment. Log analysis module 210, database query module 220, and small LOB sending module 230 are the same as log analysis module 210, database query module 220, and small LOB sending module 230 in FIG. 2.

As part of replicating a database from source database (DB) 405 (in source system 400) to a target database, log analysis module 210 analyzes source DB log data 410, producing LOB status 420. If module 210 determines that LOB status 420 indicates that the log data includes an indicator of non-inline LOB data, that LOB data has not been logged and special LOB data handling is required. Thus, database query module 220 queries the source database for the unlogged, non-inline LOB data using batched DB query 430. In response, source DB 400 produces source DB LOB data 440. Small LOB sending module 230 determines whether the LOB data is small (i.e., will fit into a message) or large (i.e., will not fit into a message). If the LOB data is small, module 230 includes the LOB data in message 450. If the LOB data is large, the LOB data in message 450 is replaced by an indicator that this is a large LOB. Module 230 sends message 450 to the target database.

Figure 5:
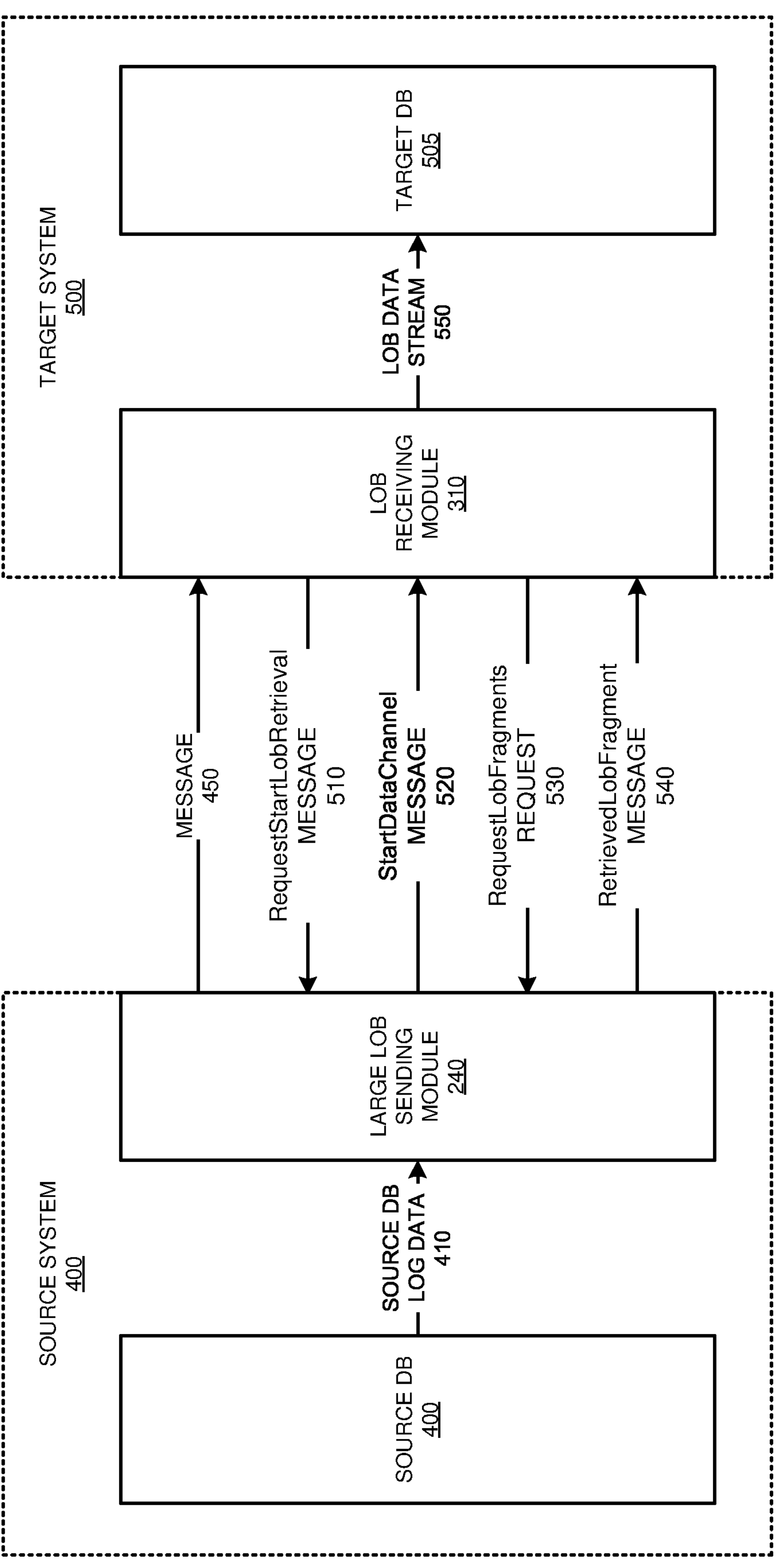
FIG. 5 depicts a flow diagram of an example configuration for LOB data replication in accordance with an illustrative embodiment.

With reference to FIG. 5, this figure depicts a flow diagram of an example configuration for LOB data replication in accordance with an illustrative embodiment. Large LOB sending module 240 is the same as large LOB sending module 240 in FIG. 2. LOB receiving module 310 is the same as LOB receiving module 310 in FIG. 3. Source system 400, source DB 405, and message 450 are the same as source system 400, source DB 405, and message 450 in FIG. 4.

When a thread applying data to target database 505 (in target system 500) encounters the first message 450 that includes a large LOB indicator instead of actual LOB data, applications 200 and 300 configure the LobRetrieval pipeline. In particular, module 310 sends RequestStartLobRetrieval message 510 to module 240 via an existing communications channel. Module 240 responds to receipt of RequestStartLobRetrieval message 510 by configuring one or more LargeLobExtractor threads and configuring communications sockets for transporting messages between target system 505 and source system 405. When the sockets have been configured, module 240 sends StartDataChannel message 520 to module 310. Module 310's receipt of StartDataChannel message 520 indicates that the LOB retrieval data channel is ready for use.

In application 300, LOB data is applied to the target database via an input stream (e.g., called a ColumnFragment input stream) that supplies the value for each LOB column. When the LOB is small, the ColumnFragment input stream reads the lob data from the message. When the lob is large, the ColumnFragment input stream reads the LOB data from the replication source process via the LobRetrieval pipeline for this thread (described elsewhere herein). When the target database calls the read( ) method of the ColumnFragment input stream, if this is the first time read( ) has been called for this lob, the ColumnFragment input stream implementation of read( ) calls a data-reading method that notifies the LobRetriever thread. The LobRetriever thread issues RequestLobFragments request 530 to module 240. RequestLobFragments request 530 requests that module 240 read the LOB data from the source database and send the read LOB data to module 310.

When application 200 receives RequestLobFragments request 530, module 240 obtains the LOB data for a requested LOB column and sends the requested data via the established data channel to module 310 using one or more RetrievedLobFragment messages 540. Each RetrievedLobFragment message 540 includes a portion of LOB data that is small enough to fit into a message.

The LobRetriever thread of module 310 receives RetrievedLobFragment messages 540, and puts LOB data received in a message into its output queue, generating LOB data stream 550. The read( ) method of the ColumnFragment input stream gets LOB data from the LobRetriever thread output queue until reaching an indicator of the end of the LOB data, and applies the data to the database.

Figure 6:
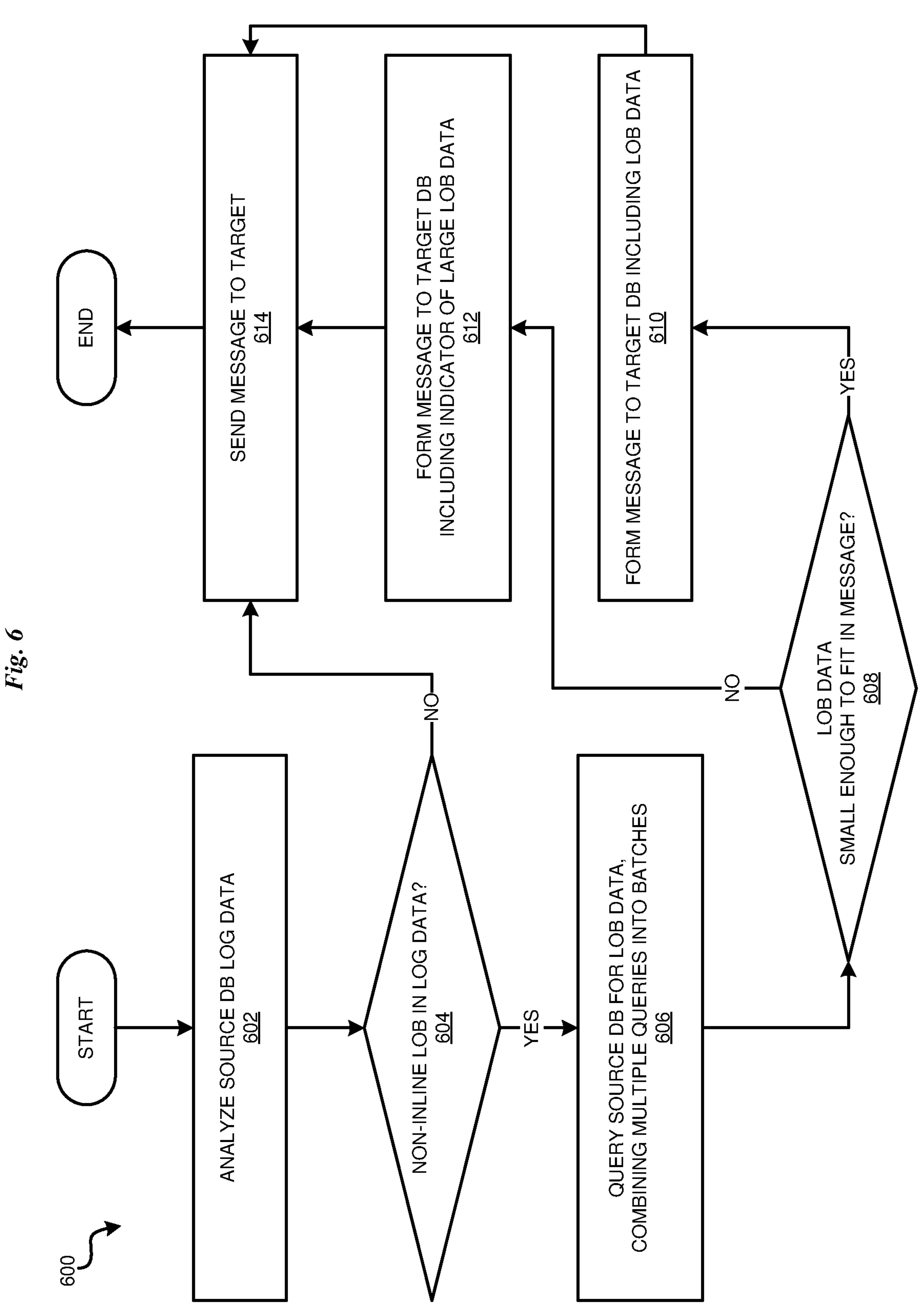
FIG. 6 depicts a flowchart of an example process for LOB data replication in accordance with an illustrative embodiment.

With reference to FIG. 6, this figure depicts a flowchart of an example process for LOB data replication in accordance with an illustrative embodiment. Process 600 can be implemented in application 200 in FIG. 2.

In block 602, the application analyzes source database (DB) log data. In block 604, the application determines whether there is non-inline LOB in the log data. If yes ("YES" path of block 604), in block 606, the application queries the source DB for LOB data, combining multiple queries into batches. In block 608, the application determines whether the LOB data is small enough to fit in a message. If yes ("YES" path of block 608), in block 610, the application forms a message to the target DB including LOB data. Otherwise ("NO" path of block 608), in block 612, the application forms a message to the target DB including an indicator of large LOB data. In block 614 (also "NO" path of block 604), the application sends the message to the target, then ends.

With reference to FIG. 7, this figure depicts a flowchart of an example process for LOB data replication in accordance with an illustrative embodiment. Process 700 can be implemented in application 300 in FIG. 3.

In block 702, the application receives a message from the source. In block 704, the application determines whether the message includes a large LOB data indicator. If yes ("YES" path of block 704), in block 706, the application sends a RequestStartLobRetrieval message to the source. In block 708, the application receives a StartDataChannel message from the source. In block 710, the application sends a RequestLobFragments request to source. In block 712, the application receives a RetrievedLobFragment message from the source. In block 714, the application saves the LOB fragment in the message in the target DB. In block 716, the application determines whether there are more LOB fragments, or portions, to process. If yes ("YES" path of block 716), the application returns to block 712. Otherwise ("NO" path of block 716) the application ends. As well, in block 718 ("NO" path of block 704), the application processes message normally, saving data in the message in the target DB, then ends.

Thus, a computer implemented method, system or apparatus, and computer program product are provided in the illustrative embodiments for LOB data replication and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

identifying, within a database table being replicated from a source database to a target database, a first logged database operation on a database column holding large object (LOB) data, wherein the first logged database operation is analyzed as part of log data analysis performed by a main source database replication thread;

querying the source database for a plurality of rows of LOB data, each row in the plurality of rows of LOB data comprising LOB data stored in the database column holding LOB data, wherein the querying comprises:

constructing a query statement corresponding to the first logged database operation;

adding, responsive to determining that a second logged database operation on a second database column holding LOB data meets a batch continuation condition, a data specification to the query statement, the data specification specified by the second logged database operation; and executing the query statement in a separate thread, wherein the separate thread executes in parallel with the main source database replication thread; and sending, responsive to determining that a first row of LOB data in the plurality of rows of LOB data is smaller than a message size threshold, the first row of LOB data to the target database, the sending performed in a first message.

2. The computer-implemented method of claim 1, further comprising:

sending, responsive to determining that a second row of LOB data in the plurality of rows of LOB data is greater than or equal to a message size threshold, a second message to the target database, the second message including a large LOB indicator.

3. The computer-implemented method of claim 2, further comprising:

receiving a LOB request message specifying the second row of LOB data; and sending, in a plurality of messages to the target database, the second row of LOB data, each message in the plurality of messages comprising a portion of the second row of LOB data.

4. The computer-implemented method of claim 3, wherein the first message is sent using a first data channel and where the plurality of messages is sent using a second data channel different from the first data channel.

5. The computer-implemented method of claim 1, wherein the database column holding LOB data is identified by determining that log data of the first logged database operation comprises a LOB data indicator.

6. The computer-implemented method of claim 1, wherein the batch continuation condition is met if the first logged database operation and the second logged database operation both specify a database insert operation on the same table.

7. The computer-implemented method of claim 1, wherein the batch continuation condition is met if the first logged database operation and the second logged database operation both specify one of a database insert operation and a database update operation on the same table.

8. A computer program product comprising one or more computer readable storage medium, and program instructions collectively stored on the one or more computer readable storage medium, the program instructions executable by a processor to cause the processor to perform operations comprising:

identifying, within a database table being replicated from a source database to a target database, a first logged database operation on a database column holding large object (LOB) data, wherein the first logged database operation is analyzed as part of log data analysis performed by a main source database replication thread;

querying the source database for a plurality of rows of LOB data, each row in the plurality of rows of LOB data comprising LOB data stored in the database column holding LOB data, wherein the querying comprises:

constructing a query statement corresponding to the first logged database operation;

adding, responsive to determining that a second logged database operation on a second database column holding LOB data meets a batch continuation condition, a data specification to the query statement, the data specification specified by the second logged database operation; and executing the query statement in a separate thread, wherein the separate thread executes in parallel with the main source database replication thread; and sending, responsive to determining that a first row of LOB data in the plurality of rows of LOB data is smaller than a message size threshold, the first row of LOB data to the target database, the sending performed in a first message.

9. The computer program product of claim 8, wherein the program instructions are stored in a computer readable storage device in a data processing system, and wherein the program instructions are transferred over a network from a remote data processing system.

10. The computer program product of claim 8, wherein the program instructions are stored in a computer readable storage device in a server data processing system, and wherein the program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

11. The computer program product of claim 8, further comprising:

sending, responsive to determining that a second row of LOB data in the plurality of rows of LOB data is greater than or equal to a message size threshold, a second message to the target database, the second message including a large LOB indicator.

12. The computer program product of claim 11, further comprising:

receiving a LOB request message specifying the second row of LOB data; and sending, in a plurality of messages to the target database, the second row of LOB data, each message in the plurality of messages comprising a portion of the second row of LOB data.

13. The computer program product of claim 12, wherein the first message is sent using a first data channel and where the plurality of messages is sent using a second data channel different from the first data channel.

14. The computer program product of claim 8, wherein the database column holding LOB data is identified by determining that log data of the first logged database operation comprises a LOB data indicator.

15. The computer program product of claim 8, wherein the batch continuation condition is met if the first logged database operation and the second logged database operation both specify a database insert operation on the same table.

16. The computer program product of claim 8, wherein the batch continuation condition is met if the first logged database operation and the second logged database operation both specify one of a database insert operation and a database update operation on the same table.

17. A computer system comprising a processor and one or more computer readable storage media, and program instructions collectively stored on the one or more computer readable storage media, the program instructions executable by the processor to cause the processor to perform operations comprising:

identifying, within a database table being replicated from a source database to a target database, a first logged database operation on a database column holding large object (LOB) data, wherein the first logged database operation is analyzed as part of log data analysis performed by a main source database replication thread;

querying the source database for a plurality of rows of LOB data, each row in the plurality of rows of LOB data comprising LOB data stored in the database column holding LOB data, wherein the querying comprises:

constructing a query statement corresponding to the first logged database operation;

adding, responsive to determining that a second logged database operation on a second database column holding LOB data meets a batch continuation condition, a data specification to the query statement, the data specification specified by the second logged database operation; and executing the query statement in a separate thread, wherein the separate thread executes in parallel with the main source database replication thread; and sending, responsive to determining that a first row of LOB data in the plurality of rows of LOB data is smaller than a message size threshold, the first row of LOB data to the target database, the sending performed in a first message.

18. The computer system of claim 17, further comprising:

sending, responsive to determining that a second row of LOB data in the plurality of rows of LOB data is greater than or equal to a message size threshold, a second message to the target database, the second message including a large LOB indicator.

* * * * *